United States Patent
Ning

(10) Patent No.: US 7,460,356 B2
(45) Date of Patent: Dec. 2, 2008

(54) NEUTRAL ELECTROLYTE FOR A WET ELECTROLYTIC CAPACITOR

(75) Inventor: Gang Ning, Myrtle Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 11/725,965

(22) Filed: Mar. 20, 2007

(65) Prior Publication Data

US 2008/0232029 A1 Sep. 25, 2008

(51) Int. Cl.
*H01G 9/02* (2006.01)

(52) U.S. Cl. .................. 361/507; 361/505; 252/62.2

(58) Field of Classification Search ............... 252/62.2; 361/505, 503, 504, 507
See application file for complete search history.

(56) References Cited

U.S. PATENT DOCUMENTS

| | | | |
|---|---|---|---|
| 2,582,993 A | 1/1952 | Howatt | |
| 2,966,719 A | 1/1961 | Park, Jr. | |
| 3,082,360 A | 3/1963 | Robinson et al. | |
| 3,138,746 A * | 6/1964 | Burger et al. ............... | 361/506 |
| 3,345,545 A | 10/1967 | Bourgault et al. | |
| 3,544,434 A | 12/1970 | Giller et al. | |
| 3,647,415 A | 3/1972 | Yano et al. | |
| 3,647,420 A | 3/1972 | Restelli | |
| 3,835,055 A * | 9/1974 | Chesnot .................... | 252/62.2 |
| 3,953,703 A | 4/1976 | Hurwitt | |
| 4,031,436 A | 6/1977 | Alwitt | |
| 4,071,878 A | 1/1978 | Stynes | |
| 4,085,435 A | 4/1978 | Galvagni | |
| 4,109,377 A | 8/1978 | Blazick et al. | |
| 4,121,949 A | 10/1978 | Walters | |
| 4,149,876 A | 4/1979 | Rerat | |
| 4,214,071 A | 7/1980 | Alvino et al. | |
| 4,408,257 A | 10/1983 | Walters | |
| 4,466,841 A | 8/1984 | Walters | |
| 4,469,610 A * | 9/1984 | Fukuda et al. ............. | 252/62.2 |

(Continued)

FOREIGN PATENT DOCUMENTS

CN 1549286 11/2004

(Continued)

OTHER PUBLICATIONS

Evans, et al., "Improved Capacitor Using Amorphous $RuO_2$", Evans Capacitor Company, 9th Int'l Seminar on Double Layer Capacitors and Similar Energy Storage Devices, Deerfield Beach, FL, 1999.

(Continued)

*Primary Examiner*—Eric Thomas
*Assistant Examiner*—David M Sinclair
(74) *Attorney, Agent, or Firm*—Dority & Manning, P.A.

(57) ABSTRACT

A working electrolyte for use in a wet electrolytic capacitor is provided. The electrolyte is relatively neutral and has a pH of from about 5.0 to about 8.0, in some embodiments from about 5.5 to about 7.5, and in some embodiments, from about 6.0 to about 7.5. Despite possessing a neutral pH level, the electrolyte is nevertheless electrically conductive. For instance, the electrolyte may have an electrical conductivity of about 10 milliSiemens per centimeter ("mS/cm") or more, in some embodiments about 30 mS/cm or more, and in some embodiments, from about 40 mS/cm to about 100 mS/cm, determined at a temperature of 25° C.

31 Claims, 2 Drawing Sheets

U.S. PATENT DOCUMENTS

| | | | |
|---|---|---|---|
| 4,470,098 A | 9/1984 | Alexander |
| 4,494,174 A | 1/1985 | Schroeder |
| 4,523,255 A | 6/1985 | Rogers |
| 4,535,389 A | 8/1985 | Buczkowski et al. |
| 4,599,383 A | 7/1986 | Satoji |
| 4,683,516 A | 7/1987 | Miller |
| 4,684,399 A | 8/1987 | Bergman et al. |
| 4,774,011 A | 9/1988 | Mori et al. |
| 4,780,797 A | 10/1988 | Libby |
| 4,786,342 A | 11/1988 | Zellner et al. |
| 4,945,452 A | 7/1990 | Sturmer et al. |
| 4,981,942 A | 1/1991 | Bockrath et al. |
| 4,985,098 A | 1/1991 | Kohno et al. |
| 4,992,910 A | 2/1991 | Evans |
| 5,002,710 A | 3/1991 | Shanefield et al. |
| 5,043,849 A | 8/1991 | Libby |
| 5,045,170 A | 9/1991 | Bullock et al. |
| 5,098,485 A | 3/1992 | Evans |
| 5,105,341 A | 4/1992 | Stephenson et al. |
| 5,160,653 A * | 11/1992 | Clouse et al. ............ 252/62.2 |
| 5,183,340 A | 2/1993 | Higginbotham et al. |
| 5,198,968 A | 3/1993 | Galvagni |
| 5,230,956 A | 7/1993 | Cole et al. |
| 5,304,330 A | 4/1994 | Tatarchuk et al. |
| 5,306,479 A | 4/1994 | Sommers |
| 5,357,399 A | 10/1994 | Salisbury |
| 5,369,547 A | 11/1994 | Evans |
| 5,394,295 A | 2/1995 | Galvagni |
| 5,400,211 A | 3/1995 | Evans |
| 5,419,824 A | 5/1995 | Weres et al. |
| 5,419,977 A | 5/1995 | Weiss et al. |
| 5,442,978 A | 8/1995 | Hildreth et al. |
| 5,448,447 A | 9/1995 | Chang |
| 5,457,862 A | 10/1995 | Sakata et al. |
| 5,469,325 A | 11/1995 | Evans |
| 5,473,503 A | 12/1995 | Sakata et al. |
| 5,495,386 A | 2/1996 | Kulkarni |
| 5,522,558 A | 6/1996 | Kaneko |
| 5,687,057 A | 11/1997 | Dapo |
| 5,726,118 A | 3/1998 | Ivey et al. |
| 5,729,428 A | 3/1998 | Sakata et al. |
| 5,737,181 A | 4/1998 | Evans |
| 5,754,394 A | 5/1998 | Evans et al. |
| 5,777,428 A | 7/1998 | Farahmandi et al. |
| 5,786,555 A | 7/1998 | Saito et al. |
| 5,786,980 A | 7/1998 | Evans |
| 5,812,367 A | 9/1998 | Kudoh et al. |
| 5,858,911 A | 1/1999 | Wellen et al. |
| 5,894,403 A | 4/1999 | Shah et al. |
| 5,920,455 A | 7/1999 | Shah et al. |
| 5,926,362 A | 7/1999 | Muffoletto et al. |
| 5,949,639 A | 9/1999 | Maeda et al. |
| 5,973,913 A | 10/1999 | McEwen et al. |
| 5,982,609 A | 11/1999 | Evans |
| 5,986,876 A | 11/1999 | Stepanov et al. |
| 6,051,044 A | 4/2000 | Fife |
| 6,052,273 A | 4/2000 | Inoue et al. |
| 6,059,847 A | 5/2000 | Farahmandi et al. |
| 6,072,692 A | 6/2000 | Hiratsuka et al. |
| 6,094,339 A | 7/2000 | Evans |
| 6,094,788 A | 8/2000 | Farahmandi et al. |
| 6,104,600 A | 8/2000 | Suhara et al. |
| 6,115,235 A | 9/2000 | Naito |
| 6,126,097 A | 10/2000 | Chen et al. |
| 6,128,179 A | 10/2000 | Morokuma |
| 6,145,765 A | 11/2000 | Capelle, Jr. et al. |
| 6,165,623 A | 12/2000 | Fife et al. |
| 6,181,546 B1 | 1/2001 | Stepanov et al. |
| 6,191,936 B1 | 2/2001 | Webber et al. |
| 6,208,502 B1 | 3/2001 | Hudis et al. |
| 6,219,222 B1 | 4/2001 | Shah et al. |
| 6,224,985 B1 | 5/2001 | Shah et al. |
| 6,301,093 B1 | 10/2001 | Noguchi et al. |
| 6,309,428 B1 | 10/2001 | Niiori et al. |
| 6,310,765 B1 | 10/2001 | Tanahashi et al. |
| 6,332,900 B1 | 10/2001 | Muffoletto et al. |
| 6,322,912 B1 * | 11/2001 | Fife ......................... 428/702 |
| 6,334,879 B1 | 1/2002 | Muffoletto et al. |
| 6,373,685 B1 | 4/2002 | Kimmel et al. |
| 6,375,704 B1 | 4/2002 | Habecker et al. |
| 6,377,442 B1 | 4/2002 | Strange et al. |
| 6,391,275 B1 | 5/2002 | Fife |
| 6,414,837 B1 | 7/2002 | Sato et al. |
| 6,416,730 B1 | 7/2002 | Fife |
| 6,420,043 B1 | 7/2002 | Fife et al. |
| 6,442,015 B1 | 8/2002 | Niiori et al. |
| 6,452,784 B2 | 9/2002 | Nakada et al. |
| 6,455,108 B1 | 9/2002 | Muffoletto et al. |
| 6,462,934 B2 | 10/2002 | Kimmel et al. |
| 6,468,605 B2 | 10/2002 | Shah et al. |
| 6,479,581 B1 | 11/2002 | Ireland et al. |
| 6,407,480 B1 | 1/2003 | Nomoto et al. |
| 6,507,480 B2 | 1/2003 | Nomoto et al. |
| 6,510,042 B1 | 1/2003 | Lee et al. |
| 6,517,645 B2 | 2/2003 | Fife |
| 6,522,523 B2 | 2/2003 | Takatomi et al. |
| 6,562,255 B1 | 5/2003 | Feger |
| 6,563,695 B1 | 5/2003 | Suzuki |
| 6,576,524 B1 | 6/2003 | Evans et al. |
| 6,592,740 B2 | 7/2003 | Fife |
| 6,594,139 B2 | 7/2003 | Muffoletto et al. |
| 6,594,140 B1 | 7/2003 | Evans et al. |
| 6,614,646 B2 | 9/2003 | Bogaki et al. |
| 6,660,583 B2 | 12/2003 | Fujino et al. |
| 6,674,635 B1 | 1/2004 | Fife et al. |
| 6,687,116 B2 | 2/2004 | Hudis |
| 6,687,117 B2 * | 2/2004 | Liu et al. ................. 252/62.2 |
| 6,699,431 B2 | 3/2004 | Clasen et al. |
| 6,707,660 B1 | 3/2004 | Evans et al. |
| 6,721,169 B2 | 4/2004 | Melody et al. |
| 6,721,170 B1 | 4/2004 | Evans et al. |
| 6,743,370 B1 | 6/2004 | Feger et al. |
| 6,761,728 B2 | 7/2004 | Harguth et al. |
| 6,776,861 B2 | 8/2004 | Wang et al. |
| 6,788,523 B1 | 9/2004 | Hossick-Schott et al. |
| 6,801,424 B1 | 10/2004 | Nielsen et al. |
| 6,802,951 B2 | 10/2004 | Hossick-Schott |
| 6,807,048 B1 | 10/2004 | Nielsen et al. |
| 6,819,544 B1 | 11/2004 | Nielsen et al. |
| 6,827,879 B2 | 12/2004 | Shinozaki et al. |
| 6,842,328 B2 | 1/2005 | Schott et al. |
| 6,850,405 B1 | 2/2005 | Mileham et al. |
| 6,859,353 B2 | 2/2005 | Elliott et al. |
| 6,859,354 B2 | 2/2005 | Viste et al. |
| 6,885,545 B2 | 4/2005 | Michel et al. |
| 6,888,717 B2 * | 5/2005 | Kinard et al. ............... 361/504 |
| 6,914,768 B2 | 7/2005 | Matsumoto et al. |
| 6,939,774 B2 | 9/2005 | Viste et al. |
| 6,942,819 B2 | 9/2005 | Ebel et al. |
| 6,965,510 B1 | 11/2005 | Liu et al. |
| 6,967,829 B2 | 11/2005 | Seitz et al. |
| 7,002,790 B2 | 2/2006 | Hossick-Schott et al. |
| 7,012,799 B2 | 3/2006 | Muffoletto et al. |
| 7,038,901 B2 | 5/2006 | Muffoletto et al. |
| 7,072,171 B2 | 7/2006 | Muffoletto et al. |
| 7,079,377 B2 | 7/2006 | Schott et al. |
| 7,081,141 B2 | 7/2006 | Hossick-Schott et al. |
| 7,085,126 B2 | 8/2006 | Muffoletto et al. |
| 7,092,242 B1 | 8/2006 | Gloss et al. |
| 7,099,143 B1 | 8/2006 | Fife et al. |
| 7,116,547 B2 | 10/2006 | Seitz et al. |
| 7,116,548 B2 | 10/2006 | Satterfield, Jr. et al. |
| 7,131,988 B2 | 11/2006 | Harguth et al. |
| 7,160,615 B2 | 1/2007 | Iwaida et al. |

| | | |
|---|---|---|
| 7,169,284 B1 | 1/2007 | Jiang et al. |
| 7,171,267 B2 | 1/2007 | Harguth et al. |
| 7,203,055 B2 | 4/2007 | Shin et al. |
| 7,279,117 B2 * | 10/2007 | Komatsu et al. ............ 252/62.2 |
| 7,377,948 B2 | 5/2008 | Faris |
| 2002/0179753 A1 | 12/2002 | Habecker et al. |
| 2003/0172774 A1 | 9/2003 | Naito et al. |
| 2004/0134874 A1 | 7/2004 | Hossick-Schott et al. |
| 2004/0219094 A1 | 11/2004 | Motchenbacher et al. |
| 2004/0225327 A1 | 11/2004 | Norton et al. |
| 2004/0240149 A1 | 12/2004 | Lessner et al. |
| 2004/0240152 A1 | 12/2004 | Hossick-Schott et al. |
| 2004/0243183 A1 | 12/2004 | Norton et al. |
| 2004/0248746 A1 | 12/2004 | Matsui |
| 2005/0002147 A1 | 1/2005 | Nielsen et al. |
| 2005/0034299 A1 | 2/2005 | Kurihara et al. |
| 2005/0089711 A1 | 4/2005 | Hossick-Schott |
| 2005/0090108 A1 | 4/2005 | Hossick-Schott et al. |
| 2005/0098242 A1 | 5/2005 | Hossick-Schott et al. |
| 2005/0146841 A1 | 7/2005 | Schott et al. |
| 2005/0150576 A1 | 7/2005 | Venigalla |
| 2005/0177193 A1 | 8/2005 | Nielsen et al. |
| 2005/0190530 A1 | 9/2005 | Muffoletto et al. |
| 2006/0028787 A1 | 2/2006 | Yoshida et al. |
| 2006/0091020 A1 | 5/2006 | Hossick-Schott et al. |
| 2006/0139850 A1 | 6/2006 | Rorvick et al. |
| 2006/0156920 A1 | 7/2006 | Ekiner et al. |
| 2006/0187616 A1 | 8/2006 | Norton et al. |
| 2006/0198081 A1 | 9/2006 | Seitz et al. |
| 2006/0198082 A1 | 9/2006 | Eberhard et al. |
| 2006/0227496 A1 | 10/2006 | Hossick-Schott et al. |

FOREIGN PATENT DOCUMENTS

| | | |
|---|---|---|
| EP | 1244168 A1 | 9/2002 |
| GB | 1071217 | 6/1967 |
| JP | 01158715 A * | 6/1989 |
| JP | 01-176226 | 7/1989 |
| JP | 02023604 A * | 1/1990 |
| JP | 02-038501 | 2/1990 |
| JP | 03-023222 | 1/1991 |
| JP | 04-070594 | 3/1992 |
| JP | 2005222851 | 8/2005 |
| JP | 2005223155 | 8/2005 |
| WO | WO 9952954 A1 | 10/1999 |
| WO | WO 01 26852 A1 | 4/2001 |
| WO | WO 0157928 A1 | 8/2001 |
| WO | WO 2004049361 A1 | 6/2004 |
| WO | WO 2006 127663 A3 | 11/2006 |

OTHER PUBLICATIONS

Fife et al., U.S. Appl. No. 11/372,486, filed Mar. 9, 2006, Wet Electrolytic Capacitor Containing a Cathode Coating.

Fife et al., U.S. Appl. No. 11/372,461, filed Mar. 9, 2006, Wet Electrolytic Capacitor.

Gang Ning, U.S. Appl. No. 11/725,966, filed Mar. 20, 2007, Cathode Coating for a Wet Electrolytic Capacitor.

Jones et al., U.S. Appl. No. 11/725,983, filed Mar. 20, 2007, Anode for use in Electrolytic Capacitors.

Jones et al., U.S. Appl. No. 11/726,029, filed Mar. 20, 2007, Wet Electrolytic Capacitor Containing a Plurality of Thin Powder-formed Anodes.

* cited by examiner

NEUTRAL ELECTROLYTE FOR A WET ELECTROLYTIC CAPACITOR

BACKGROUND OF THE INVENTION

Electrolytic capacitors are increasingly being used in the design of circuits due to their volumetric efficiency, reliability, and process compatibility. Electrolytic capacitors typically have a larger capacitance per unit volume than certain other types of capacitors, making them valuable in relatively high-current and low-frequency electrical circuits. One type of capacitor that has been developed is a wet electrolytic capacitor that includes an anode, a cathode current collector (e.g., aluminum can), and a liquid or "wet" electrolyte. Wet electrolytic capacitors tend to offer a good combination of high capacitance with low leakage current. In certain situations, wet electrolytic capacitors may exhibit advantages over solid electrolytic capacitors. For example, wet electrolytic capacitors may operate at a higher working voltage than solid electrolytic capacitors. Additionally, wet electrolytic capacitors are often larger in size than solid electrolytic capacitors, leading to larger capacitance values. Unfortunately, however, many conventional capacitors experience significant problems when used with corrosive electrolytes, such as sulfuric acid. For example, aluminum current collectors are highly sensitive to corrosion and are not generally compatible with corrosive electrolytes. Also, under certain conditions (e.g., high temperatures), coatings applied to cathode current collectors (e.g., ruthenium oxide) may become detached due to corrosion by the electrolyte. To avoid these problems, more neutral liquid electrolytes may be employed, but this often results in a corresponding sacrifice in electrical properties.

As such, a need currently exists for an improved electrolyte for use in wet electrolytic capacitors.

SUMMARY OF THE INVENTION

In accordance with one embodiment of the present invention, a wet electrolytic capacitor is disclosed that comprises an anode, a cathode current collector, and a working electrolyte disposed between the current collector and the anode. The electrolyte has a pH of from about 5.0 to about 8.0 and an electrical conductivity of from about 10 milliSiemens per centimeter or more, determined at a temperature of 25° C.

In accordance with another embodiment of the present invention, a working electrolyte for an electrolytic capacitor is disclosed. The working electrolyte comprises from about 1 to about 500 parts per million of a nitroaromatic depolarizer, the nitroaromatic depolarizer including an alkyl-substituted nitrobenzoic acid, an anhydride or salt thereof, or mixtures of any of the foregoing. The working electrolyte has a pH of from about 5.0 to about 8.0.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
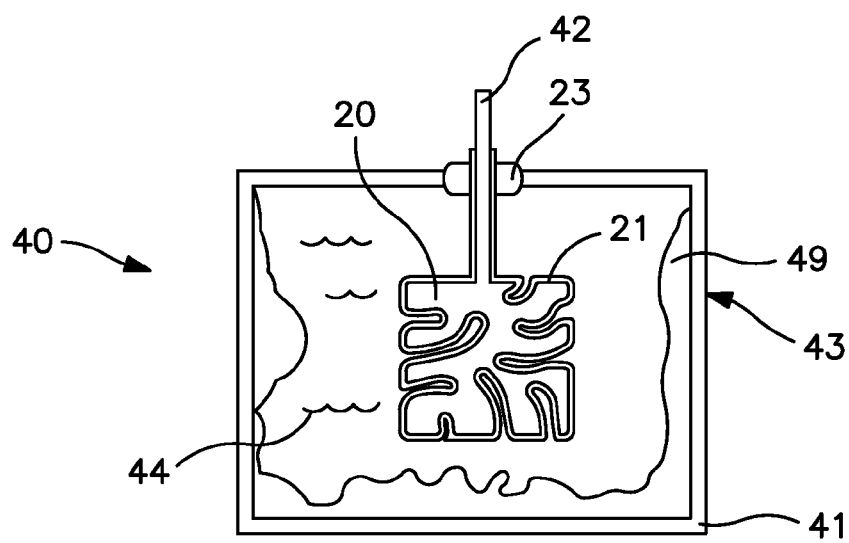
FIG. 1 is a cross-sectional view of one embodiment of a capacitor according to the present invention.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a working electrolyte for use in a wet electrolytic capacitor. The electrolyte is relatively neutral and has a pH of from about 5.0 to about 8.0, in some embodiments from about 5.5 to about 7.5, and in some embodiments, from about 6.0 to about 7.5. Despite possessing a neutral pH level, the electrolyte is nevertheless electrically conductive. For instance, the electrolyte may have an electrical conductivity of about 10 milliSiemens per centimeter ("mS/cm") or more, in some embodiments about 30 mS/cm or more, and in some embodiments, from about 40 mS/cm to about 100 mS/cm, determined at a temperature of 25° C. The value of electrical conductivity may be obtained by using any known electric conductivity meter (e.g., Oakton Con Series 11) at a temperature of 25° C.

The working electrolyte of the present invention may include a variety of components that help optimize its conductivity, pH, and stability during storage and use of the capacitor. For instance, a solvent is generally employed that functions as a carrier for the other components of the electrolyte. The solvent may constitute from about 30 wt. % to about 90 wt. %, in some embodiments from about 40 wt. % to about 80 wt. %, and in some embodiments, from about 45 wt. % to about 70 wt. % of the electrolyte. Any of a variety of solvents may be employed, such as water (e.g., deionized water); ethers (e.g., diethyl ether and tetrahydrofuran); alcohols (e.g., methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. Although not necessarily required, the use of an aqueous solvent (e.g., water) is often desired to help maintain the pH of the electrolyte at a relatively neutral level. In fact, water (e.g., deionized water) may constitute about 50 wt. % or more, in some embodiments, about 70 wt. % or more, and in some embodiments, about 90 wt. % to 100 wt. % of the solvent(s) used in the electrolyte.

The electrical conductivity of the working electrolyte of the present invention may be imparted by one or more ionic compounds, i.e., a compound that contains one or more ions or is capable of forming one or more ions in solution. Suitable ionic compounds for use in the present invention may include, for instance, inorganic acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. Anhydrides (e.g., maleic anhydride) and salts of the aforementioned acids may also be employed. The salts may be in the form of metal salts, such as sodium salts, potassium salts, calcium salts, cesium salts, zinc salts, copper salts, iron salts, aluminum salts, zirconium salts, lanthanum salts, yttrium salts, magnesium salts, strontium salts, cerium salts), or salts prepared by reacting the acids with amines (e.g., ammonia, triethylamine, tributyl amine, piperazine, 2-methylpiperazine, polyallylamine).

The concentration of ionic compounds is selected to achieve the desired balance between electrical conductivity and pH. That is, a strong acid (e.g., phosphoric acid) may be employed as an ionic compound, although its concentration is typically limited to maintain the desired neutral pH level. When employed, strong acids normally constitute from about 0.001 wt. % to about 5 wt. %, in some embodiments from about 0.01 wt. % to about 2 wt. %, and in some embodiments, from about 0.1 wt. % to about 1 wt. % of the electrolyte. Weak acids (e.g., acetic acid), on the other hand, may be employed so long as the desired electrical conductivity is achieved. When employed, weak acids normally constitute from about 1 wt. % to about 40 wt. %, in some embodiments from about 2 wt. % to about 30 wt. %, and in some embodiments, from about 5 wt. % to about 25 wt. % of the electrolyte. If desired, blends of weak and strong acids may be employed in the electrolyte. The total concentration of ionic compounds may vary, but is typically from about 1 wt. % to about 50 wt. %, in some embodiments from about 2 wt. % to about 40 wt. %, and in some embodiments, from about 5 wt. % to about 30 wt. % of the electrolyte.

If desired, basic pH modifiers may also be used in the electrolyte in an amount effective to balance the effect of the ionic compounds on pH. Suitable basic pH modifiers may include, but are not limited to, ammonia; mono-, di-, and tri-alkyl amines; mono-, di-, and tri-alkanolamines; alkali metal and alkaline earth metal hydroxides; alkali metal and alkaline earth metal silicates; and mixtures thereof. Specific examples of basic pH modifiers are ammonia; sodium, potassium, and lithium hydroxide; sodium, potassium, and lithium meta silicates; monoethanolamine; triethylamine; isopropanolamine; diethanolamine; and triethanolamine.

To ensure that the electrolyte remains stable during conditions of normal storage and use, it is generally desired that its freezing point is about −20° C. or less, and in some embodiments, about −25° C. or less. If desired, one or more freezing point depressants may be employed, such as glycols (e.g., propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); and so forth. Although the concentration of the freezing point depressant may vary, it is typically present in an amount of from about 5 wt. % to about 50 wt. %, in some embodiments from about 10 wt. % to about 40 wt. %, and in some embodiments, from about 20 wt. % to about 30 wt. % of the electrolyte. It should also be noted that the boiling point of the electrolyte is typically about 85° C. or more, and in some embodiments, about 100° C. or more, so that the electrolyte remains stable at elevated temperatures.

A depolarizer may also be employed in the working electrolyte of the present invention to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte.

Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth. Without intending to be limited by theory, it is believed that alkyl-substituted nitrobenzoic compounds may be preferentially electrochemically adsorbed on the active sites of the cathode surface when the cathode potential reaches a low region or the cell voltage is high, and may be subsequently desorbed therefrom into the electrolyte when the cathode potential goes up or the cell voltage is low. In this manner, the compounds are "electrochemically reversible", which may provide improved inhibition of hydrogen gas production.

Generally speaking, the working electrolyte of the present invention may be employed in any wet electrolytic capacitor. Due to its relatively neutral pH, the anode is particularly well suited for wet electrolytic capacitors that include an anode, cathode, and a working electrolyte disposed therebetween and in contact with the anode and the cathode. In this regard, various embodiments of wet electrolytic capacitors that may be formed according to the present invention will now be described in more detail. It should be understood that the description below is merely exemplary, and multiple other embodiments are also contemplated by the present invention.

The anode may generally be formed from a variety of different materials, For example, the anode may be formed from a powder constituted primarily by a valve metal (i.e., metal that is capable of oxidation) or from a composition that contains the valve metal as a component. Suitable valve metals that may be used include, but are not limited to, tantalum, niobium, aluminum, hafnium, titanium, alloys of these metals, and so forth. For example, the anode may be formed from a valve metal oxide or nitride (e.g., niobium oxide, tantalum oxide, tantalum nitride, niobium nitride, etc.) that is generally considered a semi-conductive or highly conductive material. Particularly suitable valve metal oxides for use in the anode include niobium oxides having an atomic ratio of niobium to oxygen of 1:less than 2.5, in some embodiments 1 less than 1.5, in some embodiments 1 less than 1.1, and in some embodiments, 1:1.0±0.2. For example, the niobium oxide may be $NbO_{0.7}$, $NbO_{1.0}$, $NbO_{1.1}$, and $NbO_2$. Additional examples of such valve metal oxides are described in U.S. Pat. No. 6,322,912 to Fife, which is incorporated herein in its entirety by reference thereto for all purposes. Examples of valve metal nitrides are also described in "Tantalum Nitride: A New Substrate for Solid Electrolytic Capacitors" by T. Tripp; Proceedings of CARTS 2000: 20th Capacitor and Resistor Technology Symposium, 6-20 Mar. 2000.

A variety of conventional fabricating procedures may generally be utilized to form the anode. For example, the anode may be formed as a foil, pressed powder, etc. as is well known in the art. Exemplary pressed powder anodes are described, for instance, in U.S. Pat. No. 7,099,143 to Fife, et al., which is incorporated herein in its entirety by reference thereto for all purposes. Alternatively, the anode may be formed from ceramic particles (e.g., $Nb_2O_5$, $Ta_2O_5$) that are chemically reduced to form an electrically conductive material (e.g., NbO, Ta). For instance, a slip composition containing the ceramic particles may be initially formed and deposited onto a substrate in the form of a thin layer. If desired, multiple layers may be formed to achieve the target thickness for the anode. Once formed, the layer(s) may be subjected to a heat treatment to chemically reduce the ceramic particles and form the electrically conductive anode. Such slip-formed anodes may exhibit a small thickness, high aspect ratio (i.e., ratio of width to thickness), and uniform density, which may in turn lead to an improved volumetric efficiency and equivalent series resistance ("ESR"). For example, the anodes may have a thickness of about 1500 micrometers or less, in some embodiments about 1000 micrometers or less, and in some embodiments, from about 50 to about 500 micrometers. Likewise, the anodes may have an aspect ratio of about 1 or more, in some embodiments about 5 or more, and in some embodiments, about 15 or more. Exemplary slip-formed anodes, such as described above, are described in a co-pending application filed on the same date as the present application and entitled "Anode for Use in Electrolytic Capacitors", which is incorporated herein in its entirety by reference thereto for all purposes.

The anode may possess any desired shape, such as square, rectangle, circle, oval, triangle, etc. Polygonal shapes having more than four (4) edges (e.g., hexagon, octagon, heptagon, pentagon, etc.) are particularly desired due to their relatively high surface area. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

Once formed, the anode may be anodized so that a dielectric film is formed over and within the anode. Anodization is an electrical chemical process by which the anode metal is oxidized to form a material having a relatively high dielectric constant. For example, a niobium oxide (NbO) anode may be anodized to form niobium pentoxide ($Nb_2O_5$). Specifically, in one embodiment, the niobium oxide anode is dipped into a weak acid solution (e.g., phosphoric acid, polyphosphoric acid, mixtures thereof, and so forth) at an elevated temperature (e.g., about 85° C.) that is supplied with a controlled amount of voltage and current to form a niobium pentoxide coating having a certain thickness. The power supply is initially kept at a constant current until the required formation voltage is reached. Thereafter, the power supply is kept at a constant voltage to ensure that the desired dielectric thickness is formed over the surface of the anode. The anodization voltage typically ranges from about 10 to about 200 volts, and in some embodiments, from about 20 to about 100 volts. In addition to being formed on the surface of the anode, a portion of the dielectric oxide film will also typically form on the surfaces of the pores of the material. It should be understood that the dielectric film may be formed from other types of materials and using different techniques.

The cathode may be constructed using any of a variety of techniques. In one embodiment, the cathode contains a current collector formed from any metal suitable for use in forming a capacitor, such as tantalum, niobium, aluminum, nickel, hafnium, titanium, copper, silver, steel (e.g., stainless), alloys thereof, and so forth. The configuration of the cathode current collector may generally vary as is well known to those skilled in the art. For example, the current collector may be in the form of a container, can, foil, sheet, foam, mesh, screen, cloth, felt, etc. In one embodiment, the cathode current collector is a mesh material. The surface area of the cathode current collector is selected to provide a certain level of capacitance. For example, the cathode current collector covers a surface area of from about 0.1 to about 25 square centimeters, in some embodiments from about 0.2 to about 15 square centimeters, and in some embodiments, from about 0.5 to about 10 square centimeters. It should be understood that the specific surface area of the current collector may be much greater than the ranges specified above.

In certain embodiments, a cathode coating is formed on the current collector that supports an electrochemical capacitance at an interface with the electrolyte and has a high ratio of surface area to volume. The cathode coating may contain electrochemically-active particles that are conductive so that the electrolyte maintains good electrical contact with the cathode current collector. The extent of conductivity may be characterized in terms of the "resistivity" of the electrochemically-active particles at about 20° C., which is generally less than about 1 ohm-cm, in some embodiments less than about $1 \times 10^{-2}$ ohm-cm, in some embodiments less than about $1 \times 10^{-3}$ ohm-cm, and in some embodiments, less than about $1 \times 10^{-4}$ ohm-cm. The electrochemically-active particles increase the effective cathode surface area over which the electrolyte electrochemically communicates with the cathode current collector. Such an increased effective cathode surface area allows for the formation of capacitors with increased cathode capacitance for a given size and/or capacitors with a reduced size for a given capacitance. Typically, the electrochemically-active particles have a specific surface area of at least about 200 $m^2/g$, in some embodiments at least about 500 $m^2/g$, and in some embodiments, at least about 1500 $m^2/g$. To achieve the desired surface area, the electrochemically-active particles generally have a small size. For example, the median size of the electrochemically-active particles may be less than about 100 micrometers, in some embodiments from about 1 to about 50 micrometers, and in some embodiments, from about 5 to about 20 micrometers. Likewise, the electrochemically-active particles may be porous. Without intending to be limited by theory, it is believed that porous particles provide a passage for the electrolyte to better contact the cathode current collector. For example, the electrochemically-active particles may have pores/channels with a mean diameter of greater than about 5 angstroms, in some embodiments greater than about 20 angstroms, and in some embodiments, greater than about 50 angstroms.

Any of a variety of electrochemically-active particles may be employed. For example, metals may be employed as electrochemically-active particles, such as particles formed from ruthenium, iridium, nickel, rhodium, rhenium, cobalt, tungsten, manganese, tantalum, niobium, molybdenum, lead, titanium, platinum, palladium, and osmium, as well as combinations of these metals. In one particular embodiment, for example, the electrochemically-active particles are palladium particles. Non-insulating oxide particles may also be employed in the present invention. Suitable oxides may include a metal selected from the group consisting of ruthenium, iridium, nickel, rhodium, rhenium, cobalt, tungsten, manganese, tantalum, niobium, molybdenum, lead, titanium, platinum, palladium, and osmium, as well as combinations of these metals. Particularly suitable metal oxides include ruthenium dioxide ($RuO_2$) and manganese dioxide ($MnO_2$). Carbonaceous particles may also be employed that have the desired level of conductivity, such as activated carbon, carbon black, graphite, etc. Some suitable forms of activated carbon and techniques for formation thereof are described in U.S. Pat. Nos. 5,726,118 to Ivey, et al.; 5,858,911 to Wellen, et al.; as well as U.S. Patent Application Publication No. 2003/0158342 to Shinozaki, et al., all of which are incorporated herein in their entirety by reference thereto for all purposes.

Because it is often difficult to bond the electrochemically-active particles directly to the cathode current collector, a binder may also be employed in the cathode coating to effectively adhere the electrochemically-active particles to the cathode current collector. Any binder that provides the desired level of adhesive strength may be used. For example, suitable binders may include polytetrafluoroethylene, polyvinylidene fluoride, carboxymethylcellulose, fluoroolefin copolymer crosslinked polymer, polyvinyl alcohol, polyacrylic acid, polyimide, petroleum pitch, coal pitch, and phenol resins.

In one particular embodiment, an amorphous polymer binder is employed in the cathode coating to help adhere the electrochemically-active particles to the cathode current collector. Many conventional binders are formed from thermoplastic polymers that are semi-crystalline or crystalline in nature (e.g., polytetrafluoroethylene). During formation of the capacitor, such binders generally melt and thereby "wet" a significant portion of the electrochemically-active particles. To the contrary, it is believed that amorphous polymers having a relatively high "glass transition temperature" ("$T_g$") do not undergo melt flow to the same extent as conventional thermoplastic binders, and thus leave portions of the particles uncovered to act as an electrochemical interface with the electrolyte and current collector, thereby enhancing capacitance. More specifically, the amorphous polymers of the present invention generally have a glass transition temperature of about 100° C. or more, in some embodiments about 150° C. or more, and in some embodiments, about 250° C. or more. As is well known in the art, glass transition temperature may be determined using differential scanning calorimetry ("DSC") in accordance with ASTM D-3418.

Any of a variety of amorphous polymers may be employed having the desired glass transition temperature. One class of particularly suitable amorphous polymers are thermoplastic polyimides, which normally contain aromatic rings coupled by imide linkages—i.e., linkages in which two carbonyl groups are attached to the same nitrogen atom. Suitable thermoplastic polyimides may include, for instance, poly(amide-imide), such as available from Solvay Polymers under the designation Torlon™; poly(ether-imide), such as available GE Plastics under the designation Ultem™); copolymers thereof; and so forth. Amide-imide polymers, for instance, may be derived form an amide-amic acid polymer precursor. The polyamide-amic acid precursor is then cured thermally, generally at a temperature above about 150° C., to form the polyamide-imide. Polyamide-amic acids may be prepared by the polycondensation reaction of at least one polycarboxylic acid anhydride or derivatives thereof, and at least one primary diamine. More particularly, the acid anhydride is typically trimellitic acid or a derivative thereof, such as a lower alkyl ester of trimellitic acid anhydride or a trimellitic acid halide (e.g., acid chloride of trimellitic anhydride, i.e. trimellitic anhydride chloride (TMAC). The primary diamine is likewise typically an aromatic diamine, such as p-phenylenediamine, m-phenylenediamine, oxybis(aniline), benzidene, 1,5-diaminonaphthalene, oxybis(2-methylaniline) 2,2-bis[4-(p-aminophenoxy)phenyl]propane, bis[4-(p-aminophenoxy)]benzene, bis[4-(3-aminophenoxy)] benzene, 4,4'-methylenedianiline, or a combination thereof. Examples of other useful aromatic primary diamines are described in U.S. Pat. Nos. 5,230,956 to Cole, et al. and 6,479,581 to Ireland, et al., which are incorporated herein in their entirety by reference thereto for all purposes. Particularly suitable aromatic diamines include meta-phenylenediamine and oxybis (aniline).

Although not required, the amorphous polymer binder may be provided in the form of particles to enhance its adhesion characteristics. When employed, such binder particles typically have a size distribution ranging from about 1 to about 250 micrometers, and in some embodiments, from about 5 to about 150 micrometers. For example, the particles may have a $D_{90}$ particle size distribution (90 wt. % of the particles have a diameter below the reported value) of about 150 micrometers or less, in some embodiments from about 100 micrometers or less, and in some embodiments, about 75 micrometers or less.

The relative amount of the electrochemically-active particles and binder in the cathode coating may vary depending on the desired properties of the capacitor. For example, a greater relative amount of electrochemically-active particles will generally result in a capacitor having a greater cathode capacitance. If the amount of the electrochemically-active particles is too great, however, the cathode coating may insufficiently bond to the cathode current collector. Thus, to achieve an appropriate balance between these properties, the cathode coating typically contains electrochemically-active particles and binder in a weight ratio, respectively, of from about 0.5:1 to about 100:1, in some embodiments from about 1:1 to about 50:1, and in some embodiments, from about 2:1 to about 20:1. The electrochemically-active particles may constitute from about 50 wt. % to about 99 wt. %, in some embodiments from about 60 wt. % to about 98 wt. %, and in some embodiments, from about 70 wt. % to about 95 wt. % of the cathode coating. Likewise, the binder may constitute from about 1 wt. % to about 40 wt. %, in some embodiments from about 2 wt. % to about 30 wt. %, and in some embodiments, from about 5 wt. % to about 20 wt. % of the cathode coating.

In addition to containing electrochemically-active particles and a binder, the cathode coating may also contain other components. For instance, a conductive filler may be employed in some embodiments to further enhance the conductivity of the coating. Such conductive fillers may be particularly beneficial in counteracting any loss of conductivity that might result from the binder covering a portion of the surface of the electrochemically-active particles. Any suitable conductive filler may be employed, such as metallic particles (e.g., silver, copper nickel, aluminum, and so forth); non-metallic particles (e.g., carbon black, graphite, and so forth). When employed, the conductive filler may constitute from about 1 wt. % to about 40 wt. %, in some embodiments from about 2 wt. % to about 30 wt. %, and in some embodiments, from about 5 wt. % to about 20 wt. % of the cathode coating.

To apply the coating to the cathode current collector, the electrochemically-active particles, binder, and/or conductive filler may be mixed with a solvent, either separately or together, to form a coating formulation. Any solvent may be employed, such as water; glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. Although the concentration of the solvent may generally vary, it is nonetheless typically present in an amount from about 25 wt. % to about 95 wt. %, in some embodiments from about 30 wt. % to about 90 wt. %, and in some embodiments, from about 40 wt. % to about 85 wt. % of the coating formulation.

The solids content and/or viscosity of the coating formulation may generally vary as desired to achieve the desired coating thickness. For example, the solids content may range from about 5% to about 60% by weight, more particularly, between about 10% to about 50% by weight, and even more particularly, between about 20% to about 40% by weight. By varying the solids content of the coating formulation, the presence of the particles in the coating may be controlled. For example, to form a cathode coating with a higher level of electrochemically-active particles, the formulation may be provided with a relatively high solids content so that a greater percentage of the particles are incorporated into the coating during the application process. In addition, the viscosity of the coating formulation may also vary depending on the coating method and/or type of solvent employed. For instance, lower viscosities may be employed for some coating techniques (e.g., dip-coating), while higher viscosities may be employed for other coating techniques. Generally, the viscosity is less than about $2 \times 10^6$ centipoise, in some embodiments less than about $2 \times 10^5$ centipoise, in some embodiments less than about $2 \times 10^4$ centipoise, and in some embodiments, less than about $2 \times 10^3$ centipoise, such as measured with a Brookfield DV-1 viscometer with an LV spindle. If desired, thickeners or other viscosity modifiers may be employed in the coating formulation to increase or decrease viscosity.

Once formed, the coating formulation may then be applied to the cathode current collector using any known technique. For example, the cathode coating may be applied using techniques such as sputtering, screen-printing, dipping, electrophoretic coating, electron beam deposition, spraying, roller pressing, brushing, doctor blade casting, centrifugal casting, masking, and vacuum deposition. Other suitable techniques are also described in U.S. Pat. Nos. 5,369,547 to Evans, et al.; 6,594,140 to Evans, et al.; and 6,224,985 to Shah, et al., which are incorporated herein in their entirety by reference thereto for all purposes. For example, the cathode current collector may be dipped into or sprayed with the coating formulation. The coating formulation may cover an entire surface of the current collector. Alternatively, the coating formulation may cover only a portion of the current collector so that space remains for a lead wire to reside against the current collector. By way of example, the coating formulation may cover from about 25% and 100% of a surface of the current collector, and in some embodiments, from about 60% to about 95% of a surface of the current collector. Upon application, the coating formulation may optionally be dried to remove any solvent(s). Drying may occur, for instance, at a temperature of from about 50° C. to about 150° C.

In addition to those identified above, other optional components may also be utilized in the wet electrolytic capacitor. For example, a conductive polymer coating may be employed that overlies the current collector and/or cathode coating. Suitable conductive polymers may include, but are not limited to, polypyrroles; polythiophenes, such as poly(3,4-ethylenedioxythiophene) (PEDT); polyanilines; polyacetylenes; poly-p-phenylenes; and derivatives thereof. The conductive polymer coating may also be formed from multiple conductive polymer layers. For example, the conductive polymer coating may contain one layer formed from PEDT and another layer formed from a polypyrrole.

Although not required, the conductive polymer coating may further increase the effective capacitance of the capacitor. For example, when a conductive monomer polymerizes, it typically assumes an amorphous, non-crystalline form, which appears somewhat like a web when viewed under scanning electron microscopy. This means that the resultant conductive polymer coating has high surface area and therefore acts to somewhat increase the effective surface area of the coated current collector to which it is applied. Various methods may be utilized to apply the conductive polymer coating to the cathode coating. For instance, techniques such as screen-printing, dipping, electrophoretic coating, and spraying, may be used to form the coating. In one embodiment, for example, the monomer(s) used to form the conductive polymer (e.g., PEDT), may initially be mixed with a polymerization catalyst to form a dispersion. For example, one suitable polymerization catalyst is BAYTRON C (Bayer Corp.), which is iron (II) toluene-sulphonate and n-butanol. BAYTRON C is a commercially available catalyst for BAYTRON M, which is 3,4-ethylenedioxythiophene, a PEDT monomer also sold by Bayer Corporation. Once a dispersion is formed, the coated cathode current collector may then be dipped into the dispersion so that conductive polymer forms. Alternatively, the catalyst and monomer(s) may also be applied separately. In one embodiment, the catalyst may be dissolved in a solvent (e.g., butanol) and then applied as a dipping solution. Although various methods have been described above, it should be understood that any other method for applying the coating comprising the conductive polymer coating may also be utilized. For example, other methods for applying such a coating comprising one or more conductive polymers may be described in U.S. Pat. Nos. 5,457,862 to Sakata, et al., 5,473,503 to Sakata, et al., 5,729,428 to Sakata, et al., and 5,812,367 to Kudoh, et al., which are incorporated herein in their entirety by reference thereto for all purposes.

A protective coating may also be optionally positioned between the conductive polymer coating and the cathode coating. It is believed that the protective coating may improve the mechanical stability of the interface between the conductive polymer coating and the cathode coating. The protective coating may be formed from a relatively insulative resinous materials (natural or synthetic). Some resinous materials that may be utilized include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The physical arrangement of the anode, cathode, and working electrolyte of the capacitor may generally vary as is well known in the art. Referring to FIG. 1, for example, one embodiment of a wet electrolytic capacitor 40 is shown that includes a working electrolyte 44 disposed between an anode 20 and a cathode 43. The anode 20 contains a dielectric film 21 and is embedded with a wire 42 (e.g., tantalum wire). The cathode 43 is formed from a cathode current collector 41 and a cathode coating 44. In this embodiment, the cathode current collector 41 is in the form of a cylindrically-shaped "can" with an attached lid. A seal 23 (e.g., glass-to-metal) may also be employed that connects and seals the anode 20 to the cathode 43. Although not shown, the capacitor 40 may also include a spacer (not shown) that holds the anode 20 steady within the cathode 43. The spacer may, for example, be made of plastic and may be washer-shaped. A separator (e.g., paper) may also be positioned between the cathode and anode to prevent direct contact between the anode and cathode, yet permit ionic current flow of working electrolyte 44 to the electrodes. Any material employed as a separator in known electrolytic-type may be used as a separator in the present invention. Examples include paper, plastic fibers, glass fibers, papers made of these fibers, porous membranes, and ion-permeable materials (e.g., Nafion™). Typically, the anode and cathode are separated by a distance of from about 10 micrometers to about 1000 micrometers. The cathode is attached to a metal wire (not shown) via spot welding for providing external connection.

Figure 2:
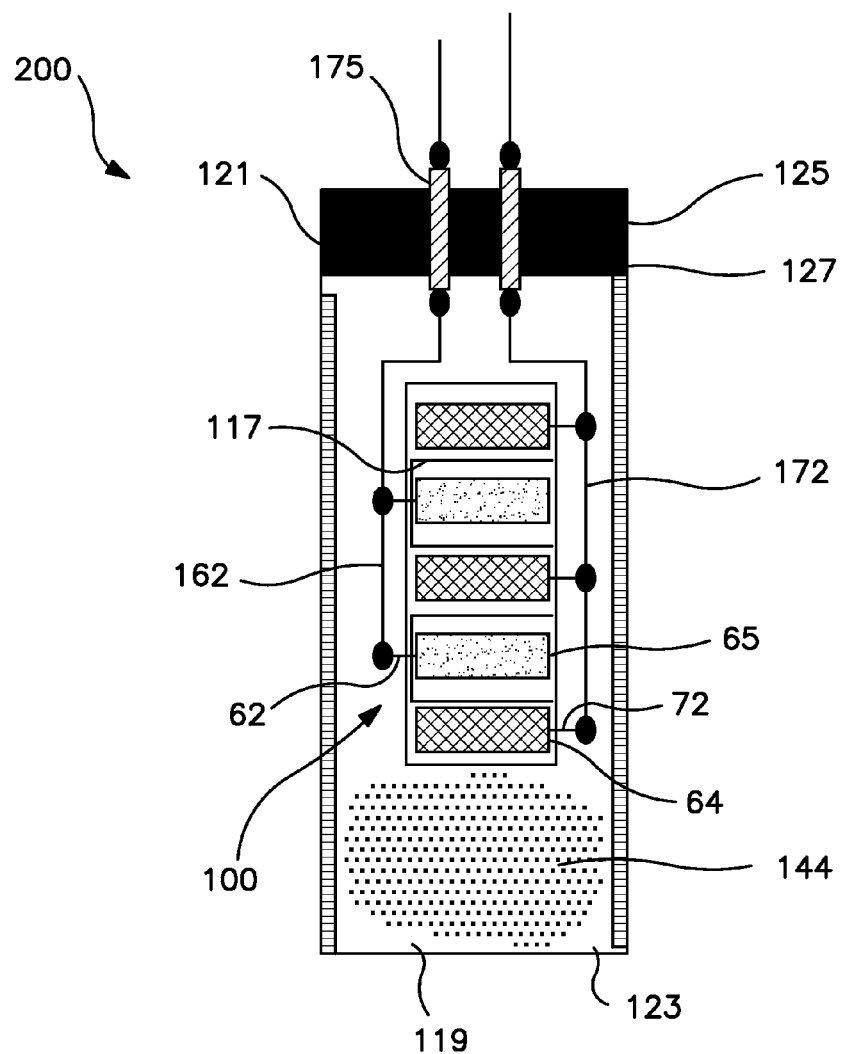
FIG. 2 is a cross-sectional view of another embodiment of a capacitor according to the present invention.

In the embodiment shown in FIG. 1, only a single anode and cathode current collector are employed. It should be understood, however, that multiple anodes and/or cathode current collectors (e.g., 2 or more) may be included within the capacitor to provide increase capacitance. Any number of anodes and/or cathode current collectors may be employed, such as from 2 to 50, in some embodiments from 4 to 40, and in some embodiments, from 6 to 30. To minimize the thickness of the assembly for "low profile" applications, the anodes and cathode current collectors are also generally arranged in a one- or two-dimensional array. Referring to FIG. 2, for instance, a capacitor 200 is shown that includes an array 100 of three (3) individual cathodes 64 and two (2) individual anodes 65 is shown. In this particular embodiment, the array 100 includes one (1) rows and one (1) column of anodes and cathodes aligned so that their top/bottom surfaces are positioned adjacent to each other to minimize the height of the assembly. For example, a top surface of a cathode defined by its width (−x direction) and length (−y direction) is placed adjacent to a corresponding bottom surface of an anode. Alternatively, the anodes and cathodes may be placed "end-to-end" so that the rear surface of one capacitor is positioned adjacent to either the front or rear surface of another capacitor. It should be understood that the anodes and cathodes need not extend in the same direction. For example, the surface of one cathode may be provided in a plane that is substantially perpendicular to the −x direction, while the surface of another cathode may be provided in a plane that is substantially perpendicular to the −y direction. Desirably, however, the anodes/cathodes extend in substantially the same direction.

To form an integrated capacitor assembly, the individual anodes and cathodes are electrically connected to respective cathode and anode terminations. The terminations serve as electrical connections for the capacitor assembly and also help to stabilize the individual anodes and cathodes against movement. Any conductive material may be employed to form the terminations, such as a conductive material (e.g., tantalum, niobium, copper, nickel, silver, nickel, zinc, tin, palladium, lead, copper, aluminum, molybdenum, titanium, iron, zirconium, magnesium, and alloys thereof). Particularly suitable conductive metals include, for instance, nickel, niobium, and tantalum. The terminations may generally be arranged in any desired manner so that they are electrically isolated from each other and able to receive the individual capacitors. In FIG. 2, for instance, the capacitor 200 includes individual cathodes 64 that contain cathode leads 72 that are commonly connected to a cathode termination 172 (e.g., tantalum wire). Similarly, individual anodes 65 contain anode leads 62 that are commonly connected to an anode termination 162 (e.g., tantalum wire). The cathode leads 72 and anode leads 62 may be electrically connected to the terminations 172 and 162, respectively, using any known technique. For example, the leads may be connected to the terminations either directly (e.g., laser welded, conductive adhesive, etc.) or via an additional conductive element (e.g., metal). Separators 117 are also positioned between the cathodes and anodes to prevent direct contact therebetween, yet permit ionic current flow of a working electrolyte 144 to the electrodes.

If desired, the components of the capacitor 200 may be encased within a container 119. Although any shape may be employed, the container 119 is in the shape of a cylinder having a top 121 and a bottom 123. The top 121 of the container 119 is covered by a lid 125 and a sealing member 127 (e.g., rubber cork). The container 119 and/or top 125 may be made from any of a variety of conductive materials, such as copper, nickel, silver, nickel, zinc, tin, palladium, lead, copper, aluminum, molybdenum, titanium, iron, zirconium, magnesium, and alloys thereof. The terminations 162 and 172 extend through the lid 125 to provide for subsequent electrical connection. To ensure electrical isolation between the terminations 162 and 172, conductive rods 175 (e.g., stainless steel, niobium, etc.) are provided that encapsulate the terminations within the areas adjacent to the lid 125.

Due in part to high conductivity, the wet electrolytic capacitor is able to achieve excellent electrical properties. For example, the equivalent series resistance ("ESR")—the extent that the capacitor acts like a resistor when charging and discharging in an electronic circuit—may be less than about 1500 milliohms, in some embodiments less than about 1000 milliohms, and in some embodiments, less than about 500 milliohms, measured with a 2-volt bias and 1-volt signal at a frequency of 1000 Hz. The electrolytic capacitor of the present invention may be used in various applications, including but not limited to medical applications, such as defibrillators; automotive applications; military applications, such as RADAR systems; and so forth. The electrolytic capacitor of the present invention may also be used in consumer electronics including radios, televisions, and so forth.

The present invention may be better understood by reference to the following examples.

Example 1

A ceramic body was initially formed from the following composition:

| Material | Wt. % |
|---|---|
| DI water | 19.05 |
| Nonionic surfactant | 0.19 |
| Anionic polymer dispersants | 1.30 |
| Acrylic binders | 9.76 |
| $Nb_2O_5$ powder | 69.70 |

The ingredients were milled in a dedicated M-18 vibratory mill. Once formed, the composition was de-aired in a slip pot by stirring for 24 hours. The slip was cast into a 0.001875-inch (1.875 mil) tape on a polypropylene carrier. The carrier with the wet tape was floated across a water bath maintained at a constant temperature of 50C for a period of 2 minutes to facilitate drying. At the end of the drying phase, a metal blade separated the cast tape from the carrier and the tape was rolled together with a single sheet of paper to keep the tape from sticking to itself during storage. 6"×6" pieces were cut from the tape. 9 of these pieces of tape were then stacked on top of each other and tacked together in a press at 3000 psi for 10 seconds. A sacrificial member was weaved within a loom and disposed between two 9-layer stacks. The sacrificial member was formed from a WN-101 fishing line made by Shakespeare (0.0083 inch in diameter). Thereafter, the stacked layers and loom were pressed together in a Shinto press for 18 seconds and at a pressure of 209 $kg_f/cm^2$. The pressed pad was cut away from the loom then laminated in a Clifton press by pressing at 1845 psi for 2 seconds and releasing the pressure, pressing for 4 seconds at 1845 psi and releasing the pressure, and & release, and then pressing at 1845 psi for 16 seconds. This laminated pad was diced into 21.2 mm×12.7 mm pieces using a PTC CC-7100 dicer. The thickness of the diced bodies was 0.7 mm. The diced bodies weighed 0.55 g each.

Example 2

A wet electrolytic capacitor was formed from the ceramic body of Example 1. Initially, a stainless steel mesh (150×150 mesh, obtained from McMaster) was cut into rectangles of 2.2 cm×1.1 cm. Cathode lead wires (annealed stainless steel 304 wire with a gauge of 150 μm) were cut to a length of 2.5 cm. These rectangles and wires were then rinsed first in 45° C. soap water for 30 minutes in an ultrasonic bath and then rinsed with deionized ("DI") water 4 times. After drying in an 85° C. oven for 30 minutes, the samples were again degreased in acetone at ambient temperature for 20 minutes. The samples were dried in an 85° C. oven to remove all the residual acetone, rinsed with DI water 5 times and then dried in 85° C. oven. The cathode lead wire was welded to the middle of the 1.1 cm edge of the rectangular mesh using a spot welder. The depth was about 1.0 mm. The rectangular meshes were then etched in a solution of 1.0 vol. % $H_2SO_4$ and 0.1 vol. % HCl for 1 minute, degreased with DI water 45 times, and then dried with a blower at ambient temperature. The resulting thickness of the mesh substrate was about 130 μm.

An ink was then prepared by mixing 4.0 grams of Norit DLC Super 30 activated carbon in 12.0 grams N-methylpyrrolidone (NMP) in a beaker with a magnetic stirrer. 0.4 grams of BP2000 carbon black was added as a conducting filler material. 0.5 grams Torlon TF 4000 (Solvay Advanced Polymers Co.) was subsequently added. Continuous mixing lasted more than 12 hours at ambient temperature. The ink was applied to the stainless steel substrate by dip coating. A spatula was used to scrape excess ink on both sides of the substrate to prevent thickening of coating at the bottom. These wet cathodes were pre-dried at 120° C. for 15 minutes and then thermally cured at 260° C. for 30 minutes. The loading was 0.0107 grams and the thickness was 150 μm.

For electrical measurement, a simple capacitor was constructed using one rectangular NbO anode against two cathodes. The anodes were formed by disposing the anode bodies of Example 1 onto a porous $Al_2O_5$ substrate. The bodies were then heated in air to 800° C. for 60 minutes. The de-bindered parts were then placed flat between two (2) tantalum substrates (0.1875 inches thick) and heated in a hydrogen atmosphere to 1200° C. for 120 minutes. Thereafter, a 0.19 mm Ta wire was inserted into the hole left by the nylon line. The wire was bonded to the body by heating the part at 1300° C. for 30 minutes in a vacuum. The anode was then anodized at 25 volts in a general phosphoric bath at 85° C. to form a dense oxide dielectric. These rectangular anodes were 20.0 mm long, 11.0 mm wide, and 0.7 mm thick. A piece of Scotch tape was used to wrap around the assembly after one anode, two cathodes and two separators were stacked together. The separators were formed from KP 60 paper (MH Technologies Co.), which had a thickness of 18 μm, length of 2.3 cm, width of 1.2 cm, and a dielectric strength of 23.6 V/μm.

Two cathode lead wires were welded to the cathode to minimize the contact resistance. The anode-separator-cathode assembly was vacuum impregnated for 30 minutes in an aqueous solution prepared according to the composition in Table 1.

TABLE 1

Composition of Working Electrolyte and Properties

| Components | Quantity | pH | Conductivity (mS/cm) | Boiling point (° C.) | Freezing point (° C.) |
|---|---|---|---|---|---|
| DI $H_2O$ | 214.4 g | 6.24 | 60 | 105 | −30 |
| Ethylene glycol | 103.2 g | | | | |
| Acetic Acid | 62.4 g | | | | |
| $H_3PO_4$ | 2.0 g | | | | |
| $NH_3 \cdot H_2O$ | 79.5 mL | | | | |
| 3-methyl-4-nitrobenzoic acid | 1.0 ppm | | | | |

EG&G 273 Potentiostat/Galvanostat and Solartron 1255 Frequency Response Analyzer (FRA) were used. Communication between the hardware and the electrochemical cell was through Screibner Corrware 2.1 software. Impedance measurement was performed on the wet anode-separator-cathode assembly within a frequency window from 0.1 Hz to 100,000 Hz and the bias was controlled at 2.0 V, 5.0 V and 8.0 V, respectively. The real part of the Nyquist plot gave the equivalent series resistance (ESR) of the capacitor for a given frequency and the imaginary part was used for the calculation of capacitance using the following formula:

$$C = \frac{1}{2 \times \pi \times f \times Z''}$$

$C$ : capacitance($F$)

$f$ : frequency(Hz)

$Z''$ : imaginary part of impedance (*ohm*)

The measured capacitance at 0.1 Hz was used to approximate the capacitance under direct current condition. It was 2.53 mF, 2.37 mF and 2.31 mF for bias of 2.0 V, 5.0 V and 8.0 V, respectively. ESR was evaluated at frequency of 1000 Hz and was not as dependent on bias as capacitance. It remained about 1.0Ω for all the bias.

The cathode was measured separately in a three-electrode system using Cyclic Voltammetry method. The counter electrode was a platinum mesh of 5.0 cm² and the reference electrode was a saturated calomel electrode (SCE). The cathode potential was scanned between –0.5 V vs. SCE and 0.5 V vs. SCE at a rate of 25 mV/s. The DC capacitance of cathode was calculated by the following formula:

$$C = \frac{\Delta Q}{\Delta U}$$

$C$ : cathode capacitance $Q$ : electrical charge $U$ : cathode potential

The cathode capacitance was estimated to be 558.7 mF, which is more than 200 times the anode capacitance.

Example 3

A capacitor was formed as described in Example 2, except that carbon black was not employed in the cathode ink. The resulting cathode loading was 0.0107 grams. The measured capacitance at 0.1 Hz was 2.57 mF, 2.42 mF and 2.37 mF for bias of 2.0 V, 5.0 V and 8.0 V, respectively. ESR at frequency of 1000 Hz was 1.98Ω. The cathode capacitance was estimated to be 550.0 mF.

Example 4

A capacitor was formed as described in Example 2, except that 1.0 gram of Torlon TF 4000 was added. The cathode loading was 0.0113 grams. The measured capacitance at 0.1 Hz was 2.54 mF, 2.41 mF and 2.35 mF for bias of 2.0 V, 5.0 V and 8.0 V, respectively. ESR at frequency of 1000 Hz was 1.35Ω. The cathode capacitance was estimated to be 550.0 mF.

Example 5

A capacitor was formed as described in Example 2, except that 0.4 grams of acetylene carbon (Chevron) was employed as the conductive filler. The cathode loading was 0.0060 grams. The measured capacitance at 0.1 Hz was 2.60 mF, 2.36 mF and 2.23 mF for bias of 2.0V, 5.0V and 8.0V, respectively. ESR at frequency of 1000 Hz was 1.15Ω. The cathode capacitance was estimated to be 500.0 mF.

Example 6

A capacitor was formed as described in Example 5, except that the stainless steel mesh was SS Monel 304 120×120 mesh. The cathode loading was 0.0074 grams. The measured capacitance at 0.1 Hz was 2.64 mF, 2.46 mF and 2.39 mF for bias of 2.0 V, 5.0 V and 8.0 V, respectively. ESR at frequency of 1000 Hz was 1.24Ω. The cathode capacitance was estimated to be 403.4 mF.

Example 7

A capacitor was formed as described in Example 6, except that the stainless steel mesh was SS Monel 316 150×150 mesh. The measured capacitance at 0.1 Hz was 2.69 mF, 2.47 mF and 2.37 mF for bias of 2.0V, 5.0 V and 8.0 V, respectively. ESR at frequency of 1000 Hz was 1.24Ω. The cathode capacitance was estimated to be 384.9 mF.

Example 8

A capacitor was formed as described in Example 5, except that the cathode substrate was nickel foam of 110 PPI (Inco). The cathode loading was 0.013 grams. The measured capacitance at 0.1 Hz was 2.66 mF, 2.37 mF and 2.28 mF for bias of 2.0 V, 5.0 V and 8.0 V, respectively. ESR at frequency of 1000 Hz was 1.13Ω. The cathode capacitance was estimated to be 1250 mF.

Example 9

A capacitor was formed as described in Example 7, except that 0.4 grams of BP2000 carbon black was employed as the conductive filler. The cathode loading was 0.074 grams. The measured capacitance at 0.1 Hz was 2.54 mF, 2.38 mF and 2.32 mF for bias of 2.0 V, 5.0 V and 8.0 V, respectively. ESR at frequency of 1000 Hz was 1.16Ω. The cathode capacitance was estimated to be 372.3 mF.

Example 10

10 pieces of NbO anodes, 11 pieces of cathodes and 20 pieces of separator paper prepared as described in Example 2 and stacked in the sequence of cathode, separator and anode. Each rectangular anode had a length of 11.0 mm, a width of 11.0 mm, and a thickness of 0.7 mm. To match the size of the anode, the cathodes were also cut to squares of 11.0 mm wide. Separator paper of the same size as in Example 2 was simply folded into a U-shape to wrap up a piece of anode. Anode lead wires and cathode lead wires came out of the stack in opposite direction. The entire stack was wrapped up with a piece of Scotch tape. All the anode tantalum and cathode stainless steel lead wires were trimmed to 6.0 mm long. Anode lead wires were welded to one heavy gauge stainless steel wire with diameter of 0.2 mm and cathode lead wires were welded to another wire. The thickness of the stack was 10.0 mm. The anode-separator-cathode assembly was vacuum impregnated for 30 minutes in an aqueous electrolyte used in Example 2. The measured capacitance at 0.1 Hz was 14.53 mF, 12.84 mF and 12.34 mF for bias of 2.0 V, 5.0 V and 8.0 V, respectively. ESR at frequency of 1000 Hz was 0.22Ω.

Example 11

Anodes and cathodes were prepared as described in Example 2 with some modifications in dimensions. Specifically, the anodes and cathode substrates were cut into a square having a width of 1.0 cm. Separator paper of the same size as in Example 2 was folded to a U-shape to wrap up an anode. Two NbO anodes were stacked together with 3 cathodes horizontally, as shown in FIG. 3. Anode tantalum lead wires and cathode stainless steel lead wires were trimmed to 6.0 mm long. The anode tantalum lead wires were welded to a heavy gauge tantalum wire of 0.2 mm diameter and the cathode stainless steel lead wires were welded to a heavy gauge stainless steel wire with laser welder under argon atmosphere protection. Both heavy gauge wires were welded to niobium rods with a spot welder. Nickels lead wires were then welded to these niobium rods. This assembly was then wrapped with scotch tape to increase compression and vacuum impregnated in the working electrolyte (set forth in Table 2 below) 30 minutes before it was inserted in the case.

The cases and rubber corks were taken from Nichicon VZ 16V-10 mF leaded aluminum electrolytic capacitors, and first cleaned in detergent and then in acetone to remove the residual chemicals. The cylindrical aluminum case had an OD of 18.0 mm and was 30.0 mm tall. The components were then used for the packaging of the wet NbO capacitors. Because the aluminum case was used only as a container but not as anode or cathode, its interior surface was masked with tape to prevent its direct contact with the anode-cathode assembly. An absorbent cotton ball was put at the bottom of the case and then pre-saturated with working electrolyte of 2.5 grams. After the electrode assembly was inserted in the case, the case was immediately crimped with a lathe. Life test required 2000-hour application of rated 16 volts at 85° C.

Two working electrolytes were prepared for testing as set forth below in Table 2.

TABLE 2

Working Electrolytes for Life Test Wet NbO parts

| Composition | A | B |
|---|---|---|
| $H_2O$ | 214.4 g | 214.4 g |
| Ethylene glycol | 103.2 g | 103.2 g |
| Acetic Acid | 62.4 g | 62.4 g |
| $H_3PO_4$ | 1.0 g | 1.0 g |
| $H_3BO_3$ | 1.0 g | 1.0 g |
| $NH_3 \cdot H_2O$ | 79.5 mL | 79.5 mL |
| 3-methyl-4-nitrobenzoic acid | 1.0 ppm | 30.0 ppm |

Thermal cycling between −30° C. and 105° C. didn't show any signs of precipitation on either electrolyte. The results of the life test are set forth below in Table 3.

TABLE 3

Results of Life Test

| | | Initial | After 2000 hours at 16 volts and 85° C. |
|---|---|---|---|
| A | Capacitance (mF) Bias of 2.0 V | 2.91 | Burst and deformation in |
| | Bias of 5.0 V | 2.54 | the samples due to gas |
| | Bias of 8.0 V | 2.44 | evolution within 72 hours |
| | ESR @ 1.0 kHz (ohm) | 1.32 | |
| | Leakage current (μA) | 10.0 | |
| B | Capacitance (mF) Bias of 2.0 V | 3.00 | 3.12 |
| | Bias of 5.0 V | 2.68 | 2.19 |
| | Bias of 8.0 V | 2.59 | 2.09 |
| | ESR @ 1.0 kHz (ohm) | 0.97 | 1.86 |
| | Leakage current (μA) | 15.9 | 1.9 |

As is apparent from Table 3, the difference in the concentration of gas evolution inhibitor, 3-methyl-4-nitrobenzoic acid, did not show significant influence on the initial performance of these capacitors. However, the capacitor that used electrolyte B showed very stable electrical characteristics under application of rated 16 volts, even after 2000 hours at 85° C. and was not damaged by gas evolution. The capacitor that used electrolyte A, which contained low concentration of gas evolution inhibitor, was broken as a result of expansion of the case caused by gas generation at an initial stage of the life test. Hence, the concentration of gas evolution inhibitor may be maintained at a relatively high level to ensure a prolonged service life.

Example 12

Anodes and cathodes were prepared as described in Example 2. The anodes were sliced to rectangles of 5.16 mm×3.88 mm×0.58 mm. Two different forming electrolytes were used in formation of these anodes. The electrolytes were 1.0 wt. % $H_3PO_4$ (phosphoric acid) and 0.5 wt % $H_3PO_4$ mixed with 0.5 wt. % $H_5PO_4$ (polyphosphoric acid). These anodes were first anodized under 24 volts at 85° C. for 120 minutes. Some anodes were later vacuum annealed and/or went through a second formation as shown in Table 1. The capacitance was determined by measuring the DC cell capacitance of these anodes against large Ta slug cathode in electrolyte B as described in Example 11 using Galvanostatic Charge/Discharge method. Leakage current was measured according in 1.0 wt. % $H_3PO_4$. DC capacitance at bias of 2.0 volts and leakage current measured 2 hours after rated voltage of 16 volts was applied were used in the calculation of normalized leakage current at 85° C. The results are set forth below in Table 4.

TABLE 4

Conditions and Results of Anodization and/or Vacuum Annealing

| Sample Groups | 1st Formation | Vacuum Annealing | 2nd Formation | Normalized leakage current at 85° C. (nA/μF/V) |
|---|---|---|---|---|
| 1 | A | — | — | 2.371 |
| 2 | A | 50 mtorrs | — | 0.264 |
| 3 | A | 10 torrs | — | 1.074 |
| 4 | A | 10 torrs | A | 0.776 |
| 5 | B | — | — | 1.071 |
| 6 | B | 50 mtorrs | — | 0.402 |
| 7 | B | 10 torrs | — | 1.062 |
| Forming electrolyte | A | 1.0 wt. % $H_3PO_4$ | | |
| | B | 0.5 wt. % $H_3PO_4$ + 0.5 wt. % $H_5PO_4$ | | |

As indicated, the anodes formed in phosphoric bath exhibited a higher leakage current than those formed in a mixture of phosphoric and polyphosphoric acid.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
an anode;
a cathode current collector; and
a working electrolyte disposed between the cathode current collector and the anode, wherein the working electrolyte comprises a nitroaromatic depolarizer in an amount of from about 10 to about 200 parts per million of the electrolyte, and wherein the electrolyte has a pH of from about 5.0 to about 8.0 and an electrical conductivity of from about 10 milliSiemens per centimeter or more, determined at a temperature of 25° C.

2. The wet electrolytic capacitor of claim 1, wherein the pH is from about 5.5 to about 7.5.

3. The wet electrolytic capacitor of claim 1, wherein the pH is from about 6.0 to about 7.5.

4. The wet electrolytic capacitor of claim 1, wherein the electrical conductivity is about 30 milliSiemens per centimeter or more.

5. The wet electrolytic capacitor of claim 1, wherein the working electrolyte comprises an aqueous solvent.

6. The wet electrolytic capacitor of claim 5, wherein the aqueous solvent constitutes from about 30 wt. % to about 90 wt. % of the working electrolyte.

7. The wet electrolytic capacitor of claim 5, wherein the aqueous solvent includes deionized water.

8. The wet electrolytic capacitor of claim 1, wherein the working electrolyte includes an ionic compound, the ionic compound including an inorganic acid, organic acid, an anhydride or salt thereof, or mixtures of any of the foregoing.

9. The wet electrolytic capacitor of claim 1, wherein the working electrolyte further comprises a basic pH modifier.

10. The wet electrolytic capacitor of claim 1, wherein the working electrolyte has a freezing point of about −20° C. or less.

11. The wet electrolytic capacitor of claim 1, wherein the working electrolyte has a boiling point of about 85° C. or more.

12. The wet electrolytic capacitor of claim 1, wherein the nitroaromatic depolarizer includes an alkyl-substituted nitrobenzoic acid, an anhydride or salt thereof, or mixtures of any of the foregoing.

13. The wet electrolytic capacitor of claim 12, wherein the alkyl-substituted nitrobenzoic acid includes 2-methyl-3-nitrobenzoic acid, 2-methyl-6-nitrobenzoic acid, 3-methyl-2-nitrobenzoic acid, 3-methyl-4-nitrobenzoic acid, 3-methyl-6-nitrobenzoic acid, or 4-methyl-3-nitrobenzoic acid.

14. The wet electrolytic capacitor of claim 1, wherein the anode includes tantalum, niobium, or an electrically conductive oxide thereof.

15. The wet electrolytic capacitor of claim 1, wherein the anode includes a valve metal oxide having an atomic ratio of metal to oxygen of 1: less than 1.5.

16. The wet electrolytic capacitor of claim 15, wherein the valve metal oxide includes niobium oxide.

17. The wet electrolytic capacitor of claim 1, further comprising a coating overlying the current collector that comprises electrochemically-active particles.

18. The wet electrolytic capacitor of claim 1, wherein the current collector includes a metal.

19. The wet electrolytic capacitor of claim 1, wherein the capacitor exhibits an ESR of about 1500 milliohms or less, measured at a frequency of 1000 Hz.

20. The wet electrolytic capacitor of claim 1, wherein the capacitor exhibits an ESR of about 500 milliohms or less, measured at a frequency of 1000 Hz.

21. A working electrolyte for an electrolytic capacitor comprising from about 1 to about 500 parts per million of a nitroaromatic depolarizer, the nitroaromatic depolarizer including an alkyl-substituted nitrobenzoic acid, an anhydride or salt thereof, or mixtures of any of the foregoing, wherein the working electrolyte has a pH of from about 5.0 to about 8.0.

22. The working electrolyte of claim 21, wherein the electrolyte has a pH of from about 5.5 to about 7.5.

23. The working electrolyte of claim 21, wherein the electrolyte has a pH of from about 6.0 to about 7.5.

24. The working electrolyte of claim 21, wherein the electrical conductivity is about 10 milliSiemens per centimeter or more.

25. The working electrolyte of claim 21, wherein the electrical conductivity is about 30 milliSiemens per centimeter or more.

26. The working electrolyte of claim 21, wherein the working electrolyte comprises an aqueous solvent.

27. The working electrolyte of claim 21, wherein the working electrolyte includes an inorganic acid, organic acid, an anhydride or salt thereof, or mixtures of any of the foregoing.

28. The working electrolyte of claim 21, wherein the working electrolyte has a freezing point of about −20° C. or less and a boiling point of about 85° C. or more.

29. The working electrolyte of claim 21, wherein the nitroaromatic depolarizer includes 2-methyl-3-nitrobenzoic acid, 2-methyl-6-nitrobenzoic acid, 3-methyl-2-nitrobenzoic acid, 3-methyl-4-nitrobenzoic acid, 3-methyl-6-nitrobenzoic acid, 4-methyl-3-nitrobenzoic acid, an anhydride or salt thereof, or mixtures of any of the foregoing.

30. The working electrolyte of claim 21, wherein the nitroaromatic depolarizer constitutes 10 to about 200 parts per million of the working electrolyte.

31. The working electrolyte of claim 21, wherein the nitroaromatic depolarizer constitutes 20 to about 150 parts per million of the working electrolyte.

* * * * *